J. W. CONVERSE.
ARMY FIELD KITCHEN.
APPLICATION FILED JULY 3, 1917.

1,331,241.

Patented Feb. 17, 1920.
8 SHEETS—SHEET 1.

Inventor:
John W. Converse
by his Attorneys
Howson & Howson

J. W. CONVERSE.
ARMY FIELD KITCHEN.
APPLICATION FILED JULY 3, 1917.

1,331,241.

Patented Feb. 17, 1920.
8 SHEETS—SHEET 3.

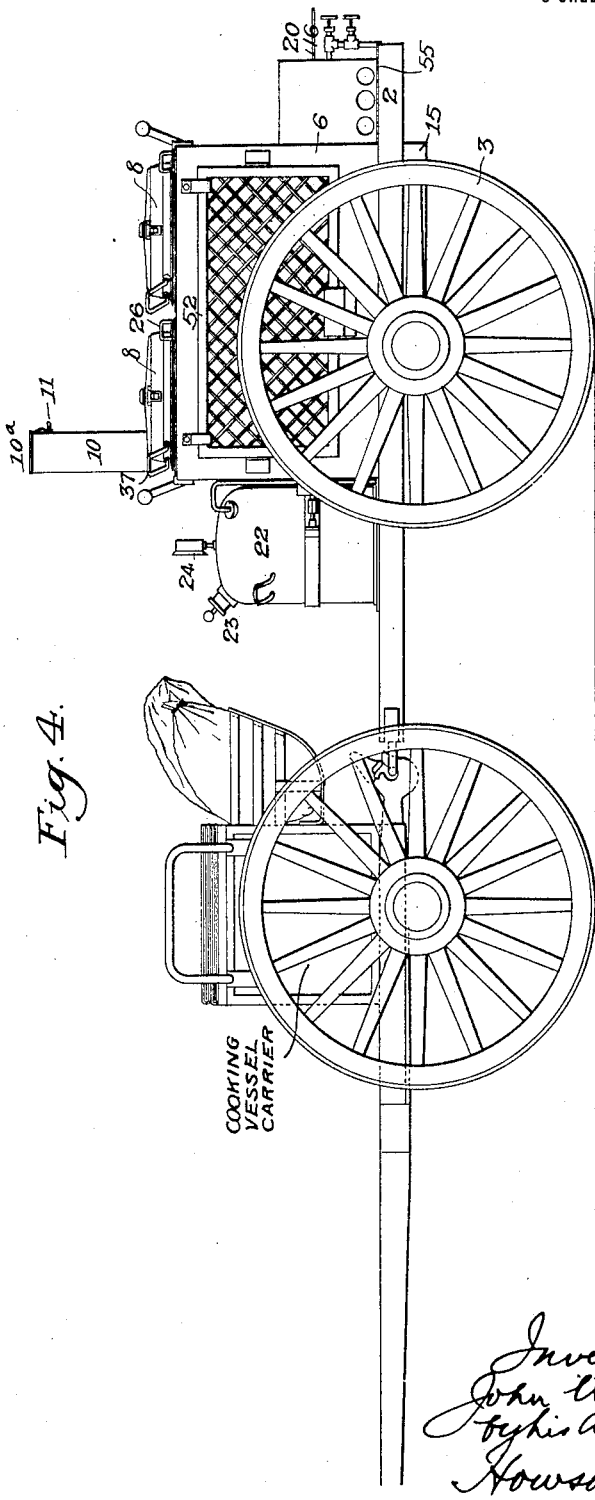

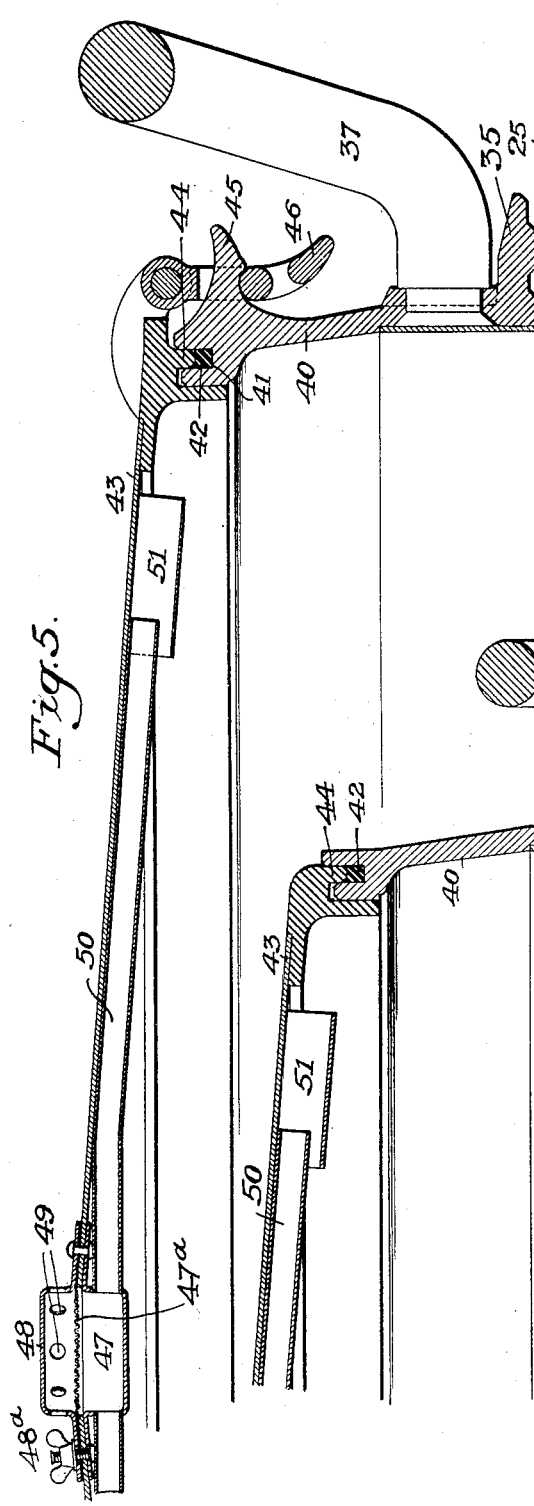
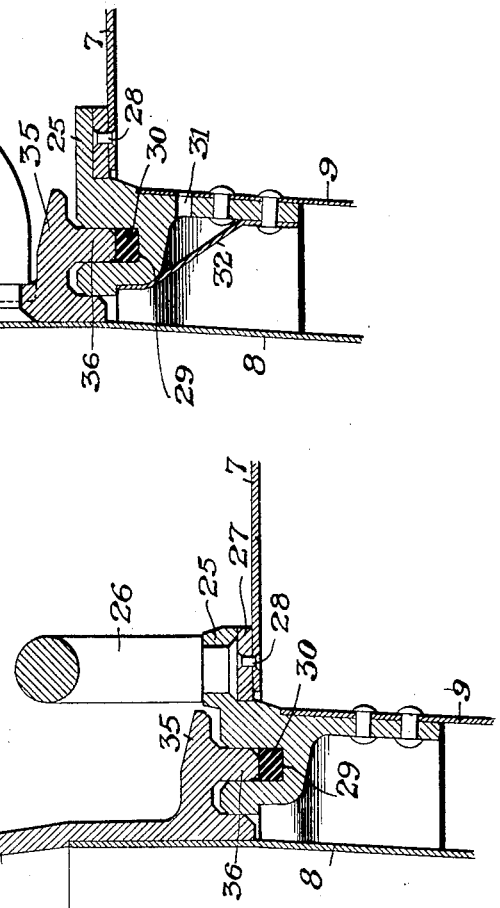

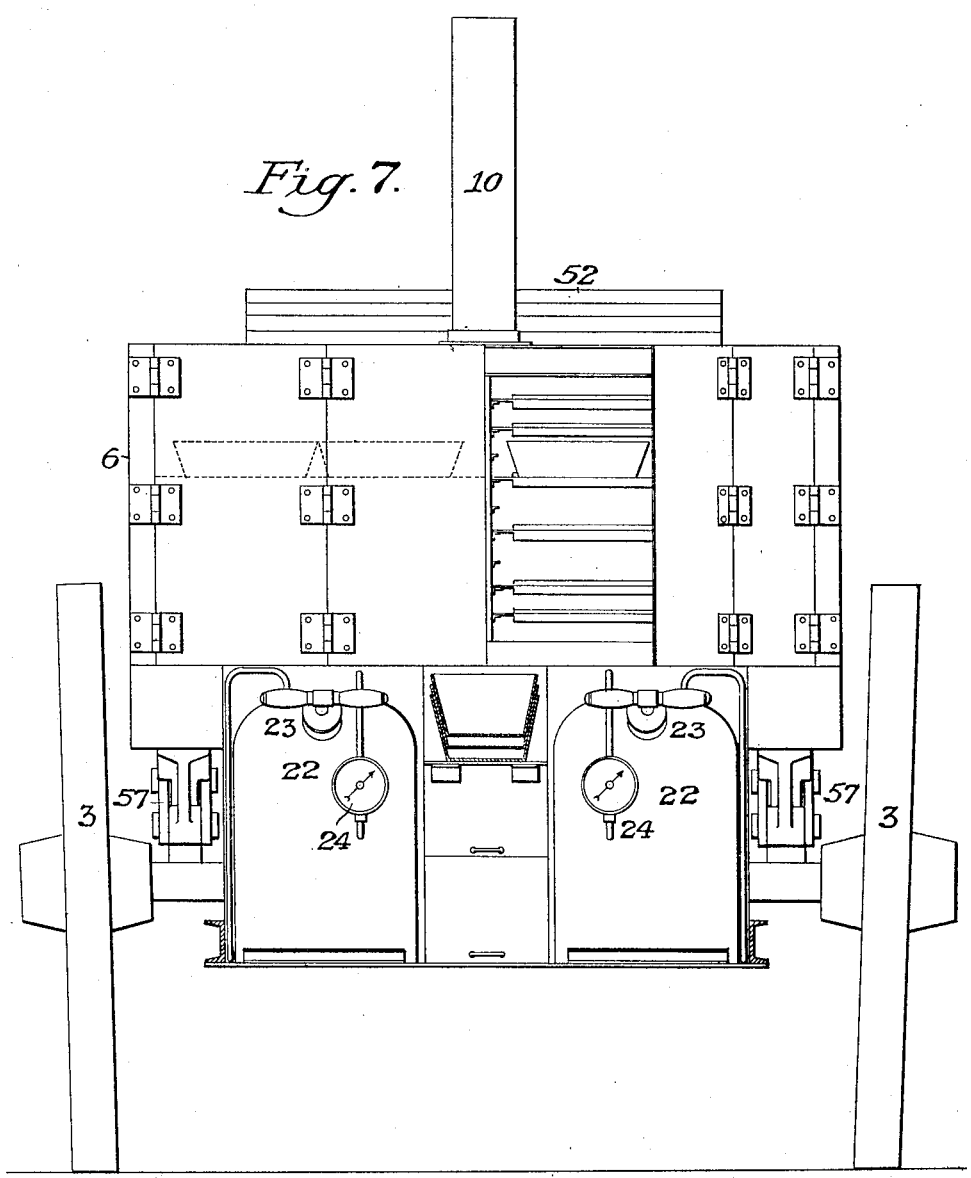

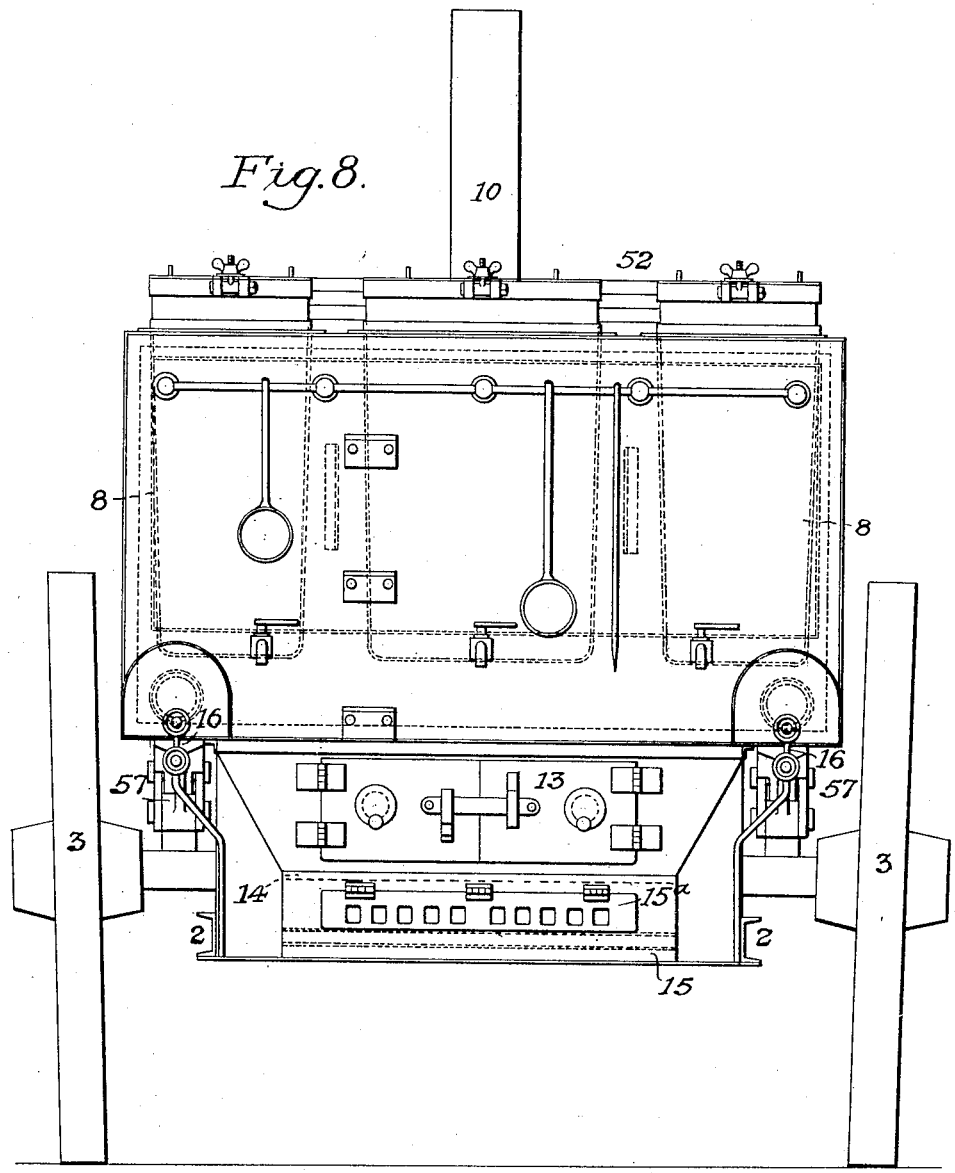

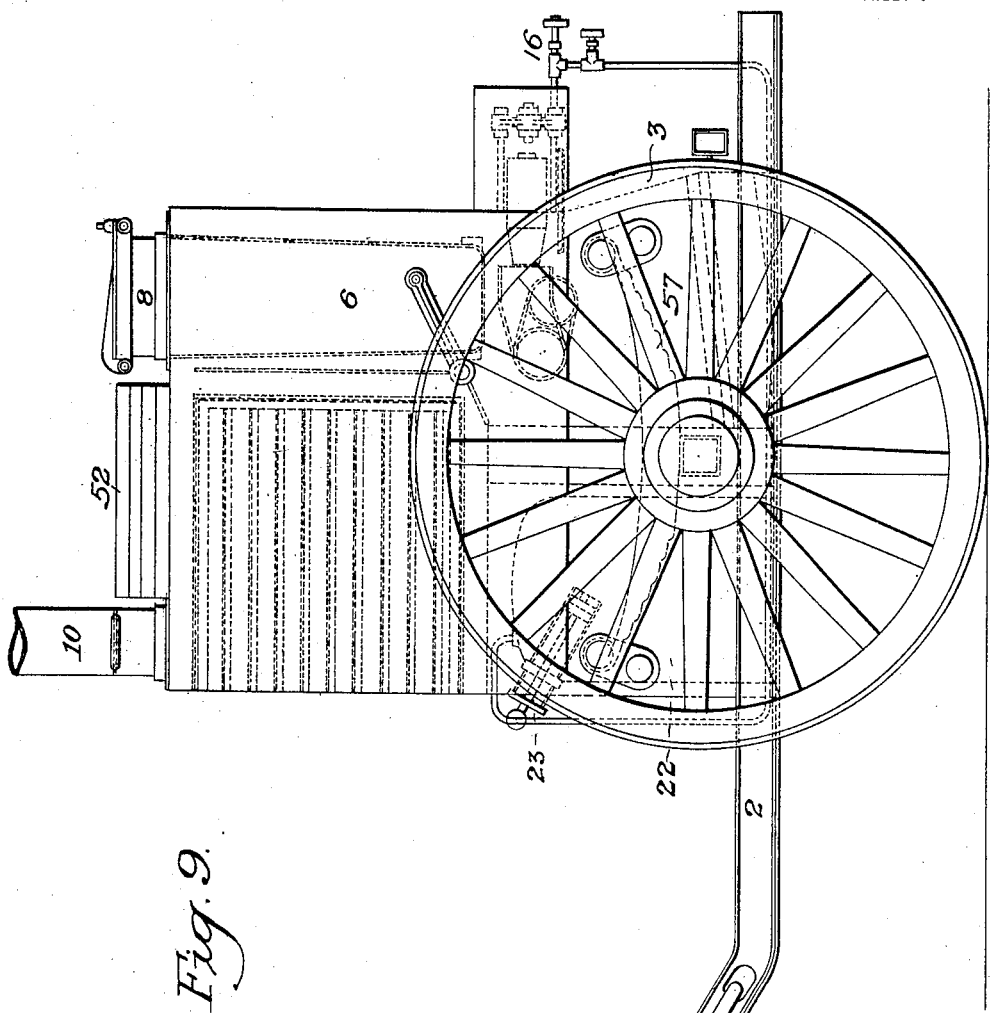

UNITED STATES PATENT OFFICE.

JOHN W. CONVERSE, OF ROSEMONT, PENNSYLVANIA.

ARMY FIELD-KITCHEN.

1,331,241.  Specification of Letters Patent.  Patented Feb. 17, 1920.

Application filed July 3, 1917. Serial No. 178,453.

*To all whom it may concern:*

Be it known that I, JOHN W. CONVERSE, a citizen of the United States, and a resident of Rosemont, Montgomery county, Pennsylvania, have invented certain Improvements in Army Field-Kitchens, of which the following is a specification.

My invention relates to portable cooking apparatus; and one object of my invention is to provide an improved structure, simple in design and easy of operation, and particularly adapted to the preparation of food for troops on the march or in the field.

A further object of my invention is to provide a structure conforming to the requirements of war service and one that is entirely mobile, being attachable to the limber of a gun carriage, or to any other movable unit of an army in the field.

An important feature of my invention is the provision of means for retaining food material of a liquid nature in the receptacles while the structure is in motion, and to this end I have devised improved forms of closures for the food receptacles and the steam or hot water jackets encircling the same; such construction preventing discharge of any liquid or food from said receptacles, but permitting proper outlet of any steam that may be generated.

In one form of my improved structure, provision is made for the support of kettles or receptacles for receiving liquid foods only, while in another form I may include an oven, in addition to the liquid food receptacles.

The cooking apparatus may be fired by coal or wood, or liquid fuel, and in the latter instance I may provide fuel tanks conveniently arranged on the supporting frame of the cooking apparatus, with special burners, and flame collectors or distributers therefor, and adjustable dampers for said flame collectors.

These and other features of my invention are more fully described hereinafter, reference being had to the accompanying drawings, in which:

Fig. 4, is a side elevation of a field kitchen or portable cooking apparatus embodying other features within the scope of my invention; showing a special limber combined therewith and serving to receive food receptacles in insulated containers which perform the function of a "fireless cooker."

Figs. 5 and 6, are sectional views illustrating the manner in which the covers of the food receptacles and the hot water jackets therefor are sealed against splashing when the structure is in motion.

Fig. 7, is a front elevation, partly in section, of another form of field kitchen or portable cooking apparatus within the scope of my invention.

Fig. 8, is a rear elevation of the same, and

Fig. 9, is a side elevation of the structure shown in Figs. 7 and 8.

Figure 1:
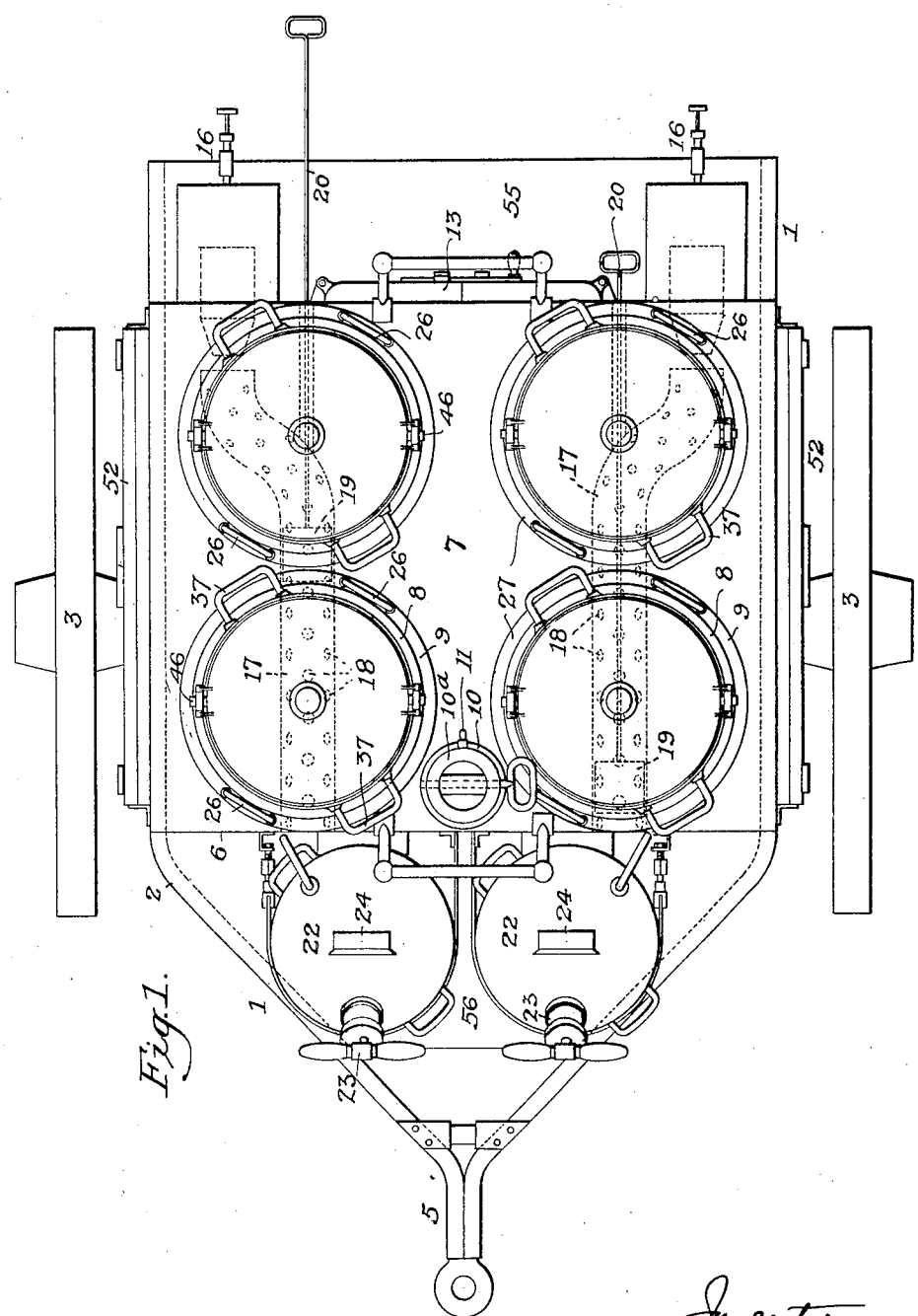
Figure 1, is a plan view of one form of field kitchen or portable cooking apparatus within the scope of my invention.

My improved army or field kitchen, or portable cooking apparatus, has been designed to meet the manifold requirements of a modern army on war footing. A special feature of the structure is its adaptability for use in mountain work; the several food receptacles being removable, and folding grates, which may be used independently of the cooking apparatus, can be employed, which parts can be packed on mules for transportation. Such grates can also be carried by the casing of the portable cooking apparatus as indicated in the drawings.

The various forms of my improved kitchen or portable cooking apparatus disclosed herewith are provided with receptacles for liquid food; one being arranged for liquid food only, while the other may include an oven for solid food. The kitchen, which is of steel construction, may be trailed behind a limber, and such limber may be employed to carry provisions. Any standard artillery-limber or motor truck may be used, and whatever form of hauling device is employed, the same is preferably provided with storage space for some of the receptacles in the form of a fireless cooker, which may be arranged at any suitable point, or in a specially constructed box under the seat for the driver, cook, or other attendants.

In the drawings, 1 represents a supporting frame, which may be made up of structural shapes such as channel sections 2, or other suitable material; such frame having wheels 3 which, in some instances, may be connected to springs whereby the structure may be readily moved, and with as little vibration and shock as possible. The channel sections of the frame are preferably brought together at the front as at 5; providing a suitable pole for connection with a motor truck or other form of motor device, or the limber of a gun carriage. Supported by the frame is a suitable heating shell or casing 6 having an apertured top 7, in which the several cooking receptacles 8 and their water jackets 9, are placed; such receptacles being disposed within a heating space within the casing, and the latter may have a stack 10, preferably collapsible or telescopic, for the exit of the products of combustion passed to said heating chamber. This casing is preferably lined with asbestos avoiding too great heating of the shell as well as radiation of the heat. The stack 10 preferably has a telescopic section 10$^a$, which may be supported by a spring bolt 11, adapted to enter apertures in said section 10$^a$; a number of which are provided. Heat may be provided by several means. If wood or other solid fuel is employed, the same may be entered through a door 13, at the rear of the structure; a grate 14 being provided for the same, with an ash receptacle 15 below the grate, normally closed by a door 15$^a$. In lieu of using wood for fuel, however, I may employ liquid fuel burners 16; the flame from the same being directed into tubular passages 17 preferably perforated at 18 so that the heat and flame can be circulated freely around the cooking receptacles before gaining access to the stack. By preference, these perforations increase in size away from the flame inlet so as to more evenly distribute the products of combustion.

The tubular passages, or combustion chamber, 17, into which the flame from the respective burners is directed, may be curved, as indicated in the drawings, and in order that the heat may be distributed as desired to any one or all of the food receptacles, as illustrated in Fig. 1, I may provide these tubular passages with adjustable dampers 19 carried by handles 20; the latter projecting through the wall of the casing and accessible from the outside of the structure in order that the dampers may be adjusted as desired. One such arrangement with one form of damper is illustrated in Fig. 1, but it will be understood that other arrangements of dampers are within the scope of my invention.

When employing liquid fuel, the same may be carried by reservoirs or receptacles 22 at the front of the portable cooking apparatus, as clearly indicated in the drawings, with suitable pumps 23, gages 24, and the necessary valved communication between the same and the burners; the latter being of any standard construction available for the purpose.

Each cooking receptacle 8 is surrounded by a hot water jacket 9 so that the application of heat in cooking the food is indirect. A special feature of my invention is the manner in which the hot water receptacles are constructed and supported by the top plate of the casing and the manner in which the food receptacles are connected thereto, and also the construction of the covers for such food receptacles.

The hot water receptacles, which are preferably circular and receiving circular food receptacles, (although they may be of other shape) are preferably provided with a flange 25, having at suitable points handles 26; such flange overlying a ring 27 at the top wall of the casing of the heating chamber, which ring is secured thereto by suitable means, such as the screws or rivets 28. In addition, the flange 25 may be provided with an annular recess or seat 29, which may receive a gasket 30, if necessary for the required close fit. Opening into the heating chamber, is a steam outlet aperture 31, although a plurality may be used, if desired, and on the inside of the jackets a guard 32 for this aperture, open at the ends, is placed; the idea being to provide sufficient opening for the escape of steam, but preventing the water splashing out. If a plurality of steam outlet apertures are employed, each will be provided with a guard of the type indicated at 32.

The cooking receptacles are preferably provided with shouldered flanges 35, and they may have rings 36 which enter the recesses or seats 29 in the flanges of the hot water receptacles and engage the gaskets 30 therein. Handles 37 are provided for the cooking receptacles and by preference they are connected to the flanges 35.

For the tops of the cooking receptacles I provide annular flanged structures 40, each having an inwardly disposed annular recess or seat 41, which, if desired, may receive a gasket 42, and the cover 43 therefor has an annular flange 44 to fit the seat and it may engage the gasket, when the latter is used. In order that the covers may be locked to the receptacles, the latter may be provided with a series of cam hooks 45 and the covers may be provided with swinging catches 46 to engage the same. It will be understood, of course, that the arrangement of the rings and recesses at the top of the water jackets and cooking receptacles may be reversed, without departing from my invention.

The covers are provided with means to permit escape of steam, preferably disposed at the center and comprising a chamber 47, with a cap 48 apertured at 49, and the under side of such cover may be provided with tubes 50, in communication with this chamber, for the passage of steam; the inlet ends of such tubes being additionally protected by guards 51 so that while steam may freely escape, the liquid and solid food contained within the receptacle is prevented from entering and clogging such tubes. The caps 48 are preferably pivotally mounted so that they may be moved to one side for cleaning purposes, and they may be retained in closed position by a thumb nut 48ª. A screen 47ª is preferably employed in the chamber 47 to prevent access of flies or other insects.

The field kitchen as described refers more particularly to the use of means for preparing liquid food or for baking, roasting and the like. In many instances, it may be desirable to provide grates for other purposes which may be set up on the ground when camp is made, and folding portable grates of suitable character may be carried at the sides of the casing 6, as indicated at 52.

The burners indicated at 16 which I may employ, may be of any standard type; the flame therefrom being directed into the tubular distributers within the heating space of the casing; the latter being perforated so that the heat will be discharged around the water jackets of the cooking receptacles, and with proper adjustment of the dampers permitting use of any one or all of the cooking receptacles. The structure will be provided with a platform 55 at the rear upon which the cook or attendant may stand, and in the form of structure shown in Figs. 1, 2, 3, et seq., a platform 56 at the front will serve to support the fuel receptacles.

In the type of structure employing an oven, the latter is preferably accessible from the front, and may extend across the entire front of the casing, with a plurality of heating chambers, and with the cooking receptacles for liquid food at the rear. These cooking receptacles may be rectangular in shape, or round, as may be desired, and they may be constructed in a manner substantially similar to the structure illustrated in Figs. 1, 2, 3 and 4, or, as illustrated in Figs. 7, 8 and 9, the water jackets for the cooking receptacles may be omitted, and the latter heated direct. In the structure providing an oven, solid or liquid fuel may be employed, as may be desired.

By reason of my improved construction, in which I provide a strong and serviceable frame made up of structural metal, and having front and back platforms, operation of the kitchen while traveling is possible. The side bars of the frame rest upon an extra heavy axle, and in some instances interposed springs 57 may be employed, transmitting the load to the wheels 3, which are preferably of standard artillery type.

In Fig. 7, illustrating a front elevation of that form of structure which provides ovens, one of said ovens is shown in the open position and illustrating the shelves to support articles of food while being cooked. In this structure, the fuel tanks are disposed below the ovens, and between the same are a series of shelves or closets for various articles; nested pans being shown on the upper shelf in cross section.

While I have shown one form of structure provided with springs and the other without, it will be understood that both structures illustrated may be provided with springs, or that the said springs may be omitted in either structure as may be desired.

Figure 2:
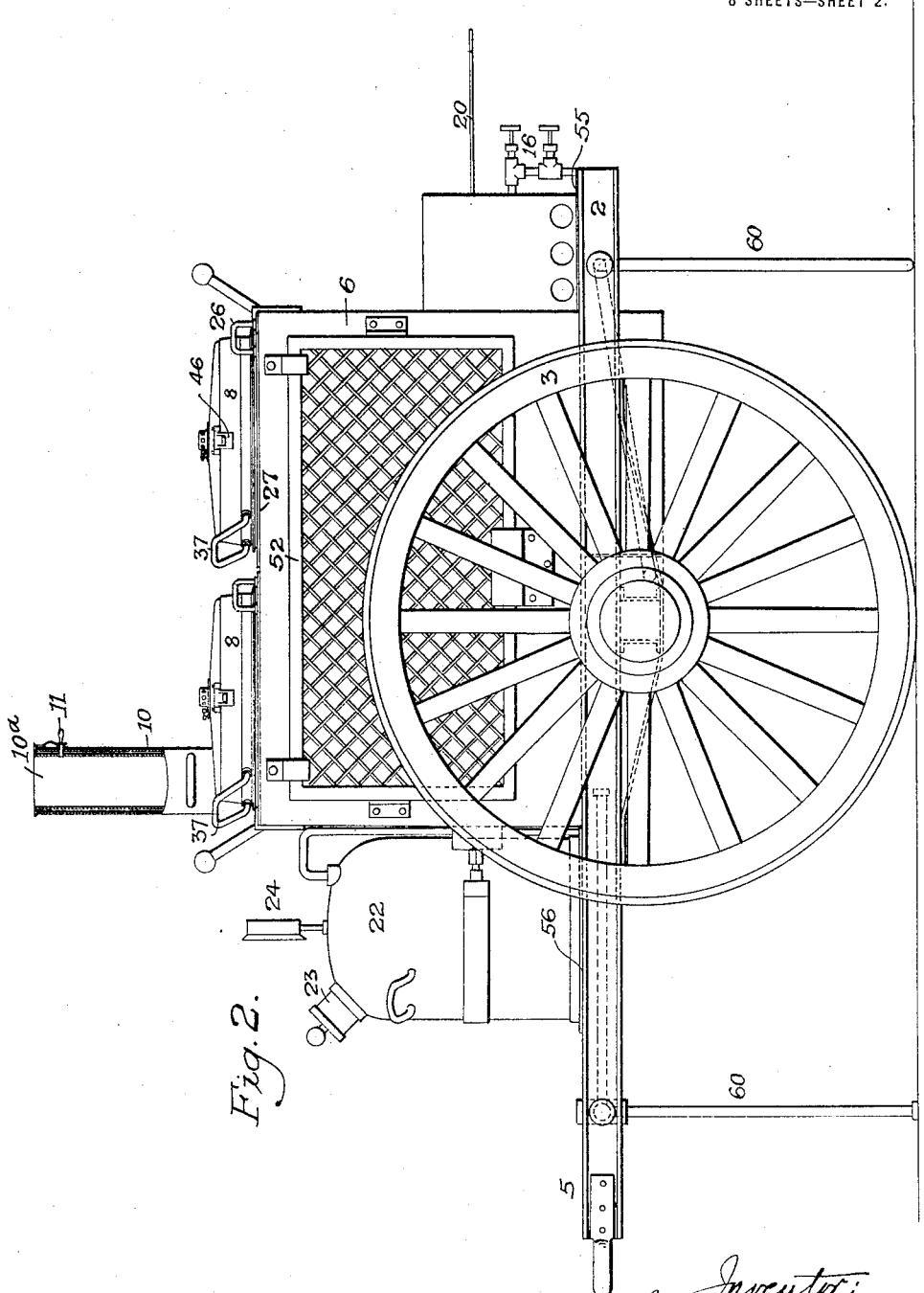
Fig. 2, is a side elevation of the same.
Figure 3:
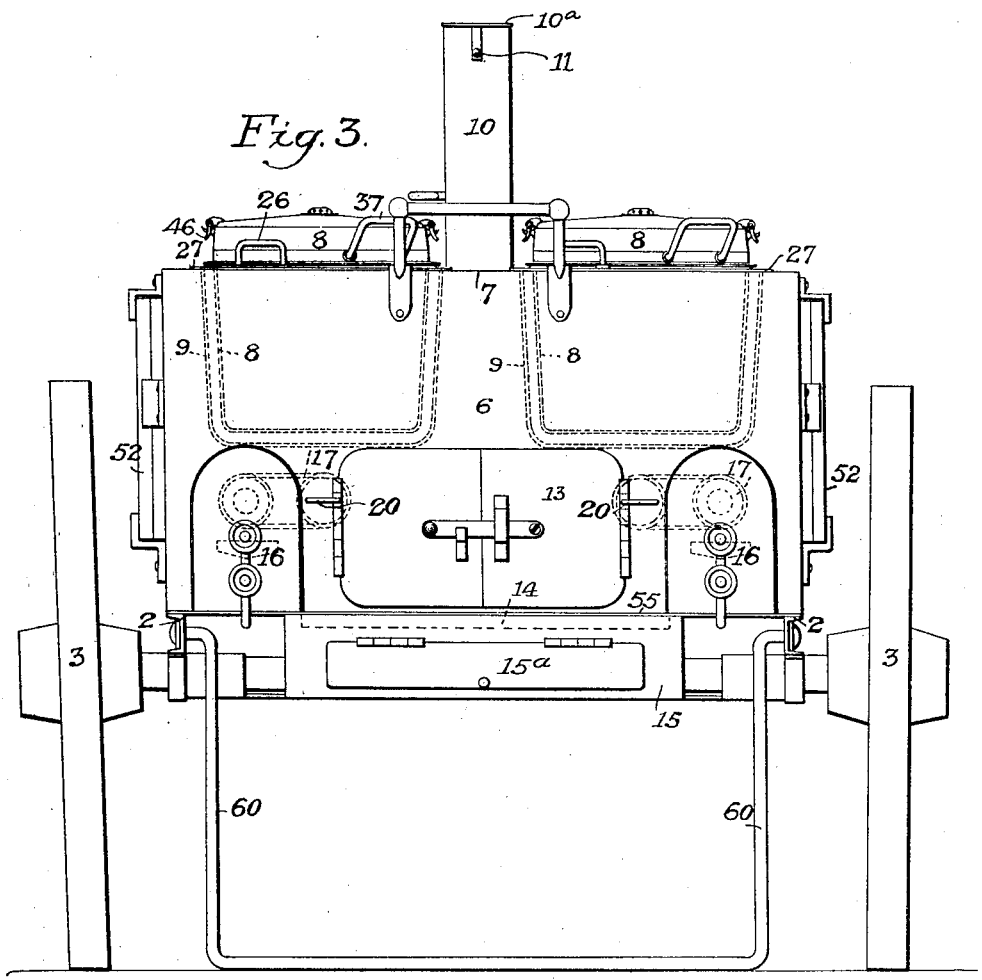
Fig. 3, is a rear elevation.

When at rest, the kitchens may be supported by the rests 60, illustrated more particularly in Figs. 2 and 3, being shown down in full lines, and raised in dotted lines.

I claim:

1. A transportable cooking device comprising a casing forming a chamber, heat producing means disposed in the lower portion of the same, a top plate, a plurality of receptacles supported by said top plate and adapted to receive water, receptacles nesting within the first named receptacles and designed to contain food material, liquid-tight connections between said receptacles, liquid-tight covers for the food receptacles, provision for the escape of steam from both of said receptacles, and guards for said steam outlets.

2. A transportable cooking device comprising a casing forming a heating chamber, perforated flues within the same, burners exterior of the casing and directing flame to said flues, an apertured top plate, a chimney carried by the same for carrying off the products of combustion from said flues, a plurality of receptacles supported by said top plate and adapted to receive water, receptacles nesting within the first-named receptacles and designed to contain food material, liquid-tight connections between said receptacles, liquid-tight covers for the food receptacles, and provision for the escape of steam from the water receptacles to the heating chamber.

3. A transportable cooking device comprising a frame, running gear therefor, a casing forming a heating chamber supported by said frame, heat producing means in the lower portion of the chamber, an apertured top plate, a plurality of water-receiving receptacles disposed in said apertures and supported by said top plate, food receptacles nesting within the first named receptacles, liquid-tight connections between said receptacles, liquid-tight covers for the food receptacles, means providing for the escape of steam from the water receptacles into the heating chamber and preventing escape of water, and means carried by the covers of the food receptacles to permit escape of steam and prevent escape of food or clogging of the steam outlet.

JOHN W. CONVERSE.